March 18, 1958 P. E. WILLMAN 2,826,980
COFFEE BASKET LIFTER
Filed Nov. 2, 1953 2 Sheets-Sheet 2
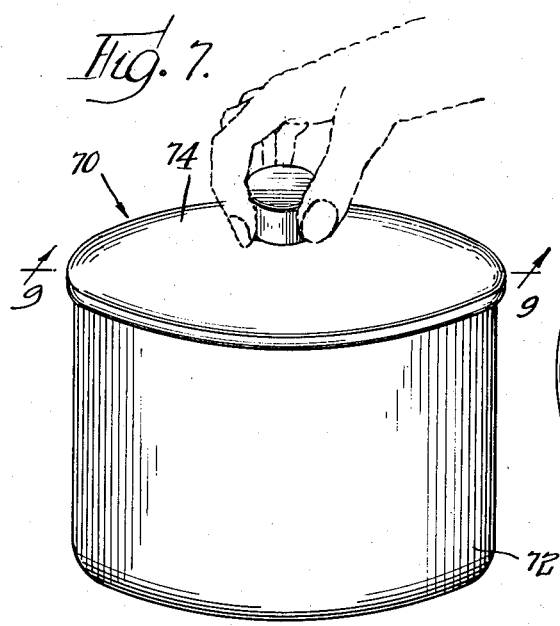
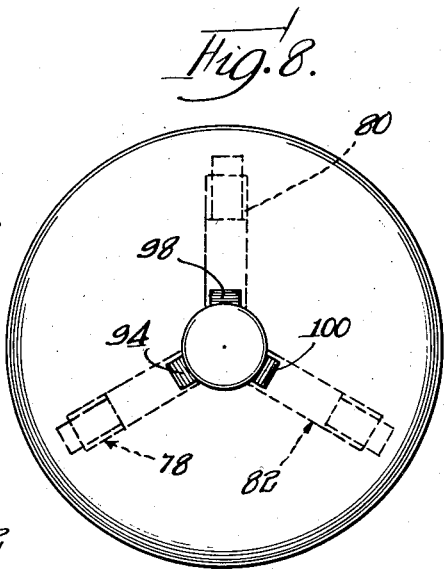
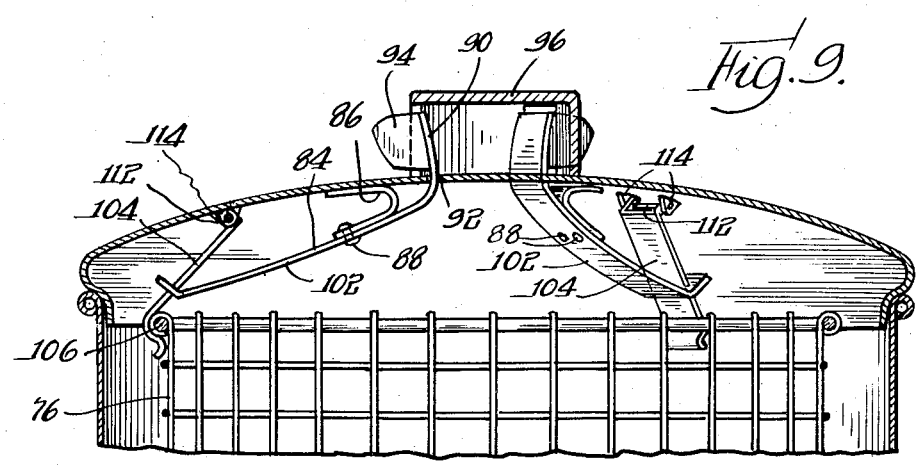
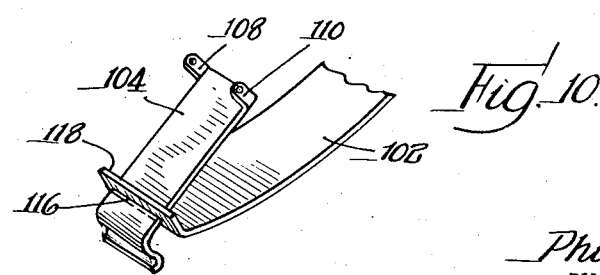
INVENTOR.
Philip E. Willman
BY
Karl H. Sommermeyer
Atty.

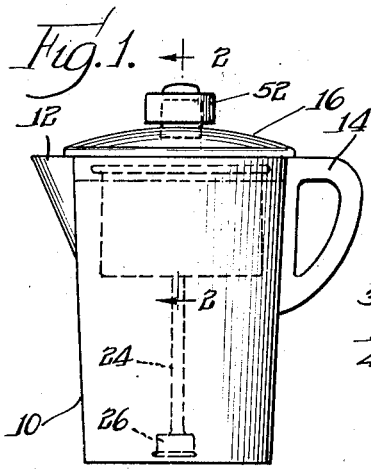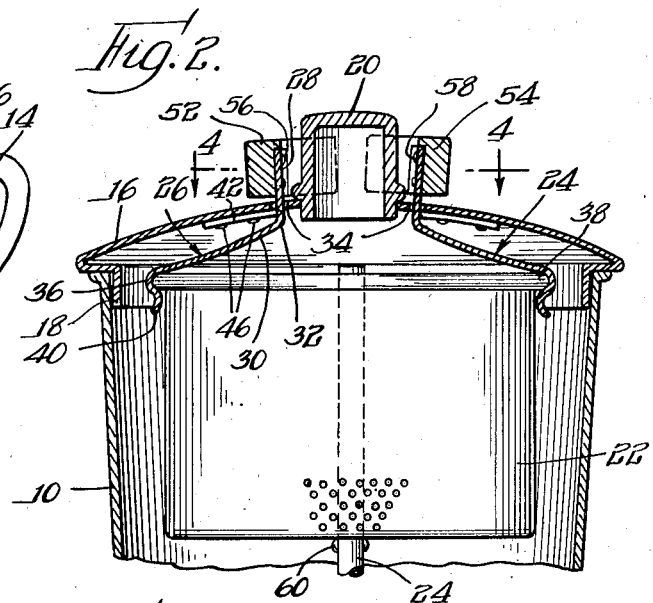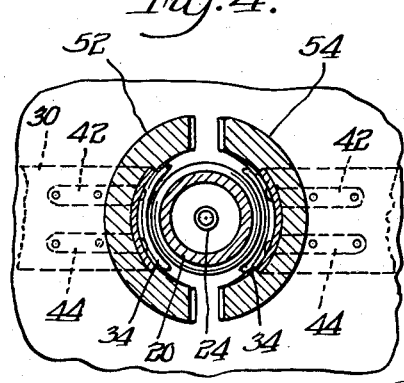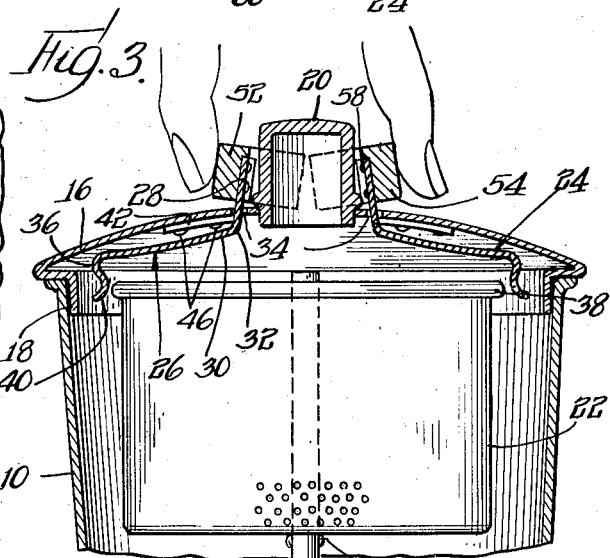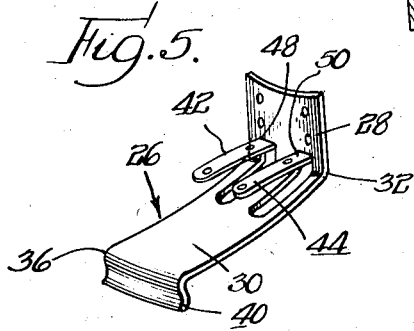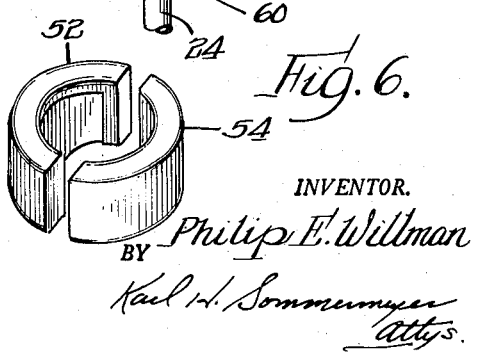
INVENTOR.
Philip E. Willman
BY Karl H. Sommermyer
Attys.

United States Patent Office 2,826,980
Patented Mar. 18, 1958

2,826,980

COFFEE BASKET LIFTER

Philip E. Willman, St. Charles, Ill., assignor to McGraw-Edison Company, Elgin, Ill., a corporation of Delaware Application November 2, 1953, Serial No. 389,649

7 Claims. (Cl. 99—317)

The present invention relates to a novel cooking apparatus, and more particularly to a novel apparatus of the type having a container, a cover, and a holder or basket adapted to receive the material to be cooked and placed in the container.

Conventional apparatus of the above described type, such as coffee brewing devices or deep fat fryers, include a container or pot, a holder or basket for coffee grounds or food, adapted to be inserted within the container, and a closure or cover for the container. Many occasions arise when it is either desirable or necessary to place the basket within or remove it from the container when the container is heated. With the conventional apparatus heretofore known, it is generally necessary for the operator to grasp the basket in his hand so that there is a danger of the hand being burned when the brewing apparatus is heated. It is, therefore, an object of this invention to provide novel means for either placing a basket or holder within or removing it from a container without touching the basket with the hand.

Another object of the present invention is to provide an apparatus of the above described type with novel, simple, and inexpensive means for connecting the basket or holder and the closure together as a unit, whereby the basket may be transported without touching it with the hand.

Another object of the present invention is to provide an apparatus of the above described type with novel and inexpensive means, whereby the basket or holder and the closure may be quickly and easily connected or disconnected whenever desired.

Still another object of the present invention is to provide a novel apparatus of the above described type with means adapted to be grasped by the operator, which means may be used either as a handle for conveying the closure or for the operating apparatus to disconnect the closure and the basket.

While the present invention will be described with particular reference to a coffee brewing apparatus and a deep fat fryer, the principles of this invention may be applied to other devices, and, therefore, other objects and advantages of this invention will become apparent from the following description and the accompanying drawings, wherein:

Fig. 1 is a side elevational view, showing a brewing apparatus embodying the principles of this invention;

Fig. 2 is an enlarged fragmentary cross sectional view taken along line 2—2 in Fig. 1;

Fig. 3 is a cross sectional view similar to Fig. 2, but showing one method of operating the novel apparatus of this invention;

Fig. 4 is a horizontal cross sectional view taken along line 4—4 in Fig. 2;

Fig. 5 is a perspective view, showing a novel element of this invention;

Fig. 6 is a perspective view, showing other novel elements of this invention;

Fig. 7 is a perspective view of a deep fat fryer embodying a slightly modified form of the present invention;

Fig. 8 is a plan view of the deep fat fryer;

Fig. 9 is an enlarged fragmentary cross sectional view taken along line 9—9 in Fig. 8; and Fig. 10 is an enlarged fragmentary perspective view showing certain novel elements of this invention in greater detail.

Referring now more specifically to the drawings, wherein like parts are designated by the same numerals throughout the various figures, an apparatus embodying the principles of this invention is shown best in Fig. 1 and includes a brewing container or coffee pot 10 having a spout 12 and a handle 14. A closure or cover 16 is provided for the container, which cover may be formed of any suitable sheet material and has its peripheral margin formed to provide a depending flange 18. The flange 18 is adapted to fit within the container to center the closure thereon. The closure 16 is provided with a central aperture for receiving a hollow cap 20 which is preferably made of glass in the usual manner. A perforate basket or holder 22 for a brewing ingredient, such as coffee, is adapted to be positioned within the container, as illustrated, and is provided with a central aperture for receiving an upstanding hollow tube 24. The lower end of the tube 24 communicates with and is connected to an inverted generally cup-shaped member 26, which cup-shaped member normally rests on the bottom of the container.

In accordance with a feature of this invention, means is provided for detachably connecting the closure 16 and the coffee basket or holder 22 together, whereby these parts may be assembled with or removed from the container as a unit. This means includes a pair of basket engaging or gripping members 24 and 26 secured to the closure and adapted to grip the holder. The gripping members are substantially identical and, therefore, only one of them need be described in detail.

Referring particularly to Figs. 2 and 5, it will be seen that the gripping member 26 is formed from sheet material and includes an actuating arm 28 and a gripping arm 30. These arms are preferably formed from an integral blank of suitable material, such as spring steel which has been bent, as at 32, to dispose the arms at an angle to each other as illustrated. The actuating arm 28 extends through a suitable slot 34 in the closure so that the arm may be easily grasped by an operator. Preferably, this slot is disposed adjacent the center portion of the cover, and the gripping member is arranged so that the gripping arm 30 extends generally radially outwardly and downwardly for engaging the peripheral edge of the coffee basket. Gripping means is associated with the outer free end of the gripipng arm, and in the illustrated embodiment, this means is in the form of a hook portion 36 adapted to interlock with a shoulder-like surface provided by a bead or flange 38 on the coffee basket. The terminal end of the gripping arm 30 is preferably flared outwardly, as at 40, to provide a cam surface for directing the hook portion over the peripheral edge of the basket.

The gripping member 26 is in effect pivotally mounted on the closure so that the member may be actuated to and from basket engaging and disengaging positions. In order to provide a simple and highly efficient pivotal mounting for the gripping member, a pair of tabs 42 and 44 are struck from the body of the gripping member, as illustrated best in Fig. 5. These tabs conform generally with the surface of the closure 16 and are secured to the closure by any suitable means, such as rivets 46. The tabs 42 and 44 are integrally connected with the gripping member along bend lines 48 and 50, respectively, so that upon application of pressure to the actuating arm 28, as fully described hereinbelow, the gripping member pivots about these bend lines 48 and 50 so that the gripping arm 30 is moved to or from gripping and non-gripping positions. Preferably, the tabs 42 and 44 are formed so that the bend lines 48 and 50 are located on the actuating arm 28, whereby a relatively small movement of the actuating arm produces a relatively large movement of the gripping arm 30.

In order to enable an operator to grasp the actuating arms of the gripping members 24 and 26, handle members 52 and 54 are secured to these arms by any suitable means, such as rivets 56 and 58. The handle members may be formed from any suitable heat insulating material, such as Bakelite. As shown best in Figs. 4 and 6, the handle members 52 and 54 are generally semicircular so that they surround a substantial portion of the glass top 20. However, it should be noted that the opposed ends of the handle members are spaced apart sufficiently to permit the handle members to be moved together, as illustrated in Fig. 3. If desired, the inner faces of the handle members may be recessed, as illustrated, for receiving the actuating arms of the gripping members. As shown best in Fig. 4, these actuating arms are formed so that they have an arcuate cross section, whereby they conform generally with the shape of their respective handle members. In addition, by providing the actuating arms with arcuate cross sections, the strength and rigidity of the arms is materially increased.

The operation of the above described apparatus is as follows. The closure 16 and the coffee basket or holder 22 may be assembled together as a unit merely by positioning the closure over the basket and moving these elements together so that the hook portions of the gripping members interengage with the bead 38 on the basket. It will be understood that the inherent resiliency of the gripping members, and particularly the inherent resiliency of the material at the junction lines 48 and 50 normally biases the gripping members toward their basket gripping positions shown in Fig. 2. It is obvious that the closure may be assembled with the basket either before or after the basket is positioned within the brewing container 10. Whenever it is desired to disconnect the closure and the basket, it is merely necessary for the operator to grasp the handle members 52 and 54 between his fingers, as shown in Fig. 3, and press the handle members together, whereby the gripping members pivot to raise the gripping arms out of engagement with the basket. Since there may be occasions when it is desirable to support the basket 22 within the brewing container without connecting the basket to the closure, suitable means, such as lugs 60, may be provided on the upstanding tube 24 for preventing the basket from dropping to the bottom of the container.

The actuating arms of the gripping members and the heat insulating handle members mounted thereon may also be used for assembling the closure with or removing it from the brewing container either with or without disconnecting the basket from the closure. In order to use the handle members for transporting the closure without disconnecting the basket, it is merely necessary for the operator to grasp the handle members at points offset about 90° from the points illustrated in Fig. 3. In other words, the operator should grasp the handle members by placing his fingers at the free ends thereof, whereby the pressure applied is directed generally axially of the pivot or junction lines 48 and 50 of the gripping members, and the gripping members will remain in engagement with the basket.

A modified form of the present invention which is especially useful for relatively large cooking devices is illustrated in Figs. 7 through 10. In these figures, the invention is shown applied to a deep fat fryer 70 including a container 72, a cover or closure 74, and a material or food basket 76.

As shown best in Figs. 8 and 9, a plurality of basket gripping means 78, 80, and 82 are secured to and spaced around the cover 74 for connecting the cover to the basket. Since these gripping means are identical, only the gripping means 78 will be described in detail. The gripping means 78 includes a member 84 pivotally mounted intermediate its ends to a generally mid portion of the cover by means of a resilient strap or leaf spring 86 which is bent into a generally U-shape. One leg of the strap is fixed to the cover in any suitable manner, such as by welding, and the other leg of the strap is fixed to the member 34 by means of a rivet 88. Actuating end portion 90 of the member 84 extends upwardly and outwardly from the cover through an aperture 92. A handle or gripping member 94 is riveted or otherwise secured to the end portion 90 to permit actuation of the end portion without danger of burning the fingers of the operator. Preferably, a cap 96, which may also be made from a heat insulating material, is secured to the cover 74 and partially encloses the handle member 94 on the gripping means 98, as well as handle members 98 and 100 of the gripping means 80 and 82 respectively. The opposite end portion 102 of the member 84 extends underneath the cover and toward the periphery thereof to a point adjacent the periphery of the basket 76. A gripping member 104 is associated with the end portion 102 of the member 84 for engaging beneath a flange 106 on the basket 76 which in the illustrated embodiment is provided by a wire encircling the upper edge of the basket. As shown best in Fig. 10, the gripping member or lever arm 104 is provided with a pair of apertured ears 108 and 110 adapted to receive a pivot pin 112 extending through a bearing member 114 fixed to the cover. The gripping member 104 extends through an aperture 116 in an upwardly turned terminal end portion 118 of the member 84 so that as the member 84 moves in the manner described below, the gripping member is brought into engagement with or disengages from the basket.

The operation of the apparatus shown in Figs. 7 through 10 is similar to the operation of the device shown in Figs. 1 through 6. Thus, the cover 74 may be assembled with the basket 76 by bringing these parts together until the gripping members of the several gripping means hook beneath the basket flange 106. It is understood that the leaf spring 86 normally resiliently biases the member 84 downwardly so that this member pivots in the opening or slot 92, whereby the gripping member 104 is resiliently urged into engagement with the basket. Of course, the gripping members of the other gripping means are also resiliently urged into engagement with the basket. In order to release the basket, it is merely necessary to press inwardly on the handles 94, 98, and 100 of the gripping means, which action causes the member 84 and other similar members to pivot toward the cover, thus spreading the gripping members outwardly beyond the periphery of the basket.

From the description, it is seen that the present invention has provided a novel and simple apparatus, whereby the closure and the brewing ingredient basket or holder may be quickly and substantially instantaneously connected and disconnected. Furthermore, it is seen that the novel apparatus of the present invention provides handle members which may be used either to actuate the gripping members or to transport the closure and basket unit.

While the preferred embodiments of the present invention have been shown and described herein, it is obvious that many changes may be made in structural details without departing from the spirit and scope of the appended claims.

I claim:

1. An apparatus comprising a closure for a container, a plurality of members spaced around said closure and respectively including connected first and second arm portions, said first arm portions extending generally axially outwardly through slot means in a mid-portion of said closure and said second arm portions extending generally radially outwardly beneath said closure, gripping means connected with radially outer ends of said second arm portions for detachably engaging an ingredient holder disposed therebetween and beneath said closure, and resilient sheet material elements respectively connected with intermediate portions of said members and with said closure for mounting said members on the closure and yieldably locating axially outer ends of said first arm portions in predetermined spaced apart positions and simultaneously yieldably positioning said radial outer ends of said second arm portions and, thus, said gripping means associated with said radially outer end portions in predetermined positions toward each other for engaging an ingredient holder, said outer ends of said second arm portions being spread apart to spread said gripping means and release an ingredient holder when said outer ends of said first arm portions are manually shifted toward each other.

2. An apparatus, as defined in claim 1, wherein each of said gripping means is provided by a continuation of its associated second arm portion.

3. An apparatus, as defined in claim 1, wherein each of said gripping means includes a lever-like member having one end pivotally connected to the closure and the other end disposed for engagement with the holder, and said lever-like member being interconnected with and actuated by the outer end of its associated second arm portion.

4. An apparatus, as defined in claim 3, wherein one portion of a lever-like member and its associated second arm portion has an aperture therein, and the other of said last mentioned portions slidably extends through said aperture for interconnecting said last mentioned portions.

5. An apparatus, as defined in claim 1, which includes a heat insulating cap-like member secured to said mid portion of the closure and providing means adapted to be grasped by an operator without pressing on said first arm portions.

6. An apparatus, as defined in claim 1, said first arm portions are movable toward each other when pressure is applied thereto in one direction, said portions being substantially immovable when pressure is applied thereto in another direction, whereby the portions may be used as a handle, and heat insulating members secured to said portions and being exposed so that they may be grasped in a plurality of directions by an operator.

7. An apparatus, comprising closure means for a container, a plurality of gripping members for detachably interconnecting said closure means with an ingredient holder, each of said gripping members including a sheet material arm portion extending inwardly from the closure means for interengagement with a holder and an integral angularly disposed arm portion extending outwardly through confining slot means in the closure means, and tab means struck from at least one of the arm portions of each of said gripping members and secured to the closure means for pivotally mounting the members on said closure means, said tab means being disposed at an angle to said one arm portion such that the inherent resiliency of the metal yieldably urges said gripping members to holder engaging positions.

References Cited in the file of this patent

UNITED STATES PATENTS

| | | |
|---|---|---|
| 1,429,751 | Mazzullo | Sept. 19, 1922 |
| 1,802,268 | Onofrio | Apr. 21, 1931 |
| 1,832,854 | Blier | Nov. 24, 1931 |
| 2,109,363 | Williams | Feb. 22, 1938 |
| 2,266,268 | Robinson | Dec. 16, 1941 |
| 2,284,359 | Bellows | May 26, 1942 |
| 2,302,653 | Lebus | Nov. 17, 1942 |
| 2,346,924 | Lehmann | Apr. 18, 1944 |